Sept. 16, 1930.          A. L. PETERSON          1,775,915
                         MIRROR FOR WATCHES
                         Filed Jan. 8, 1929
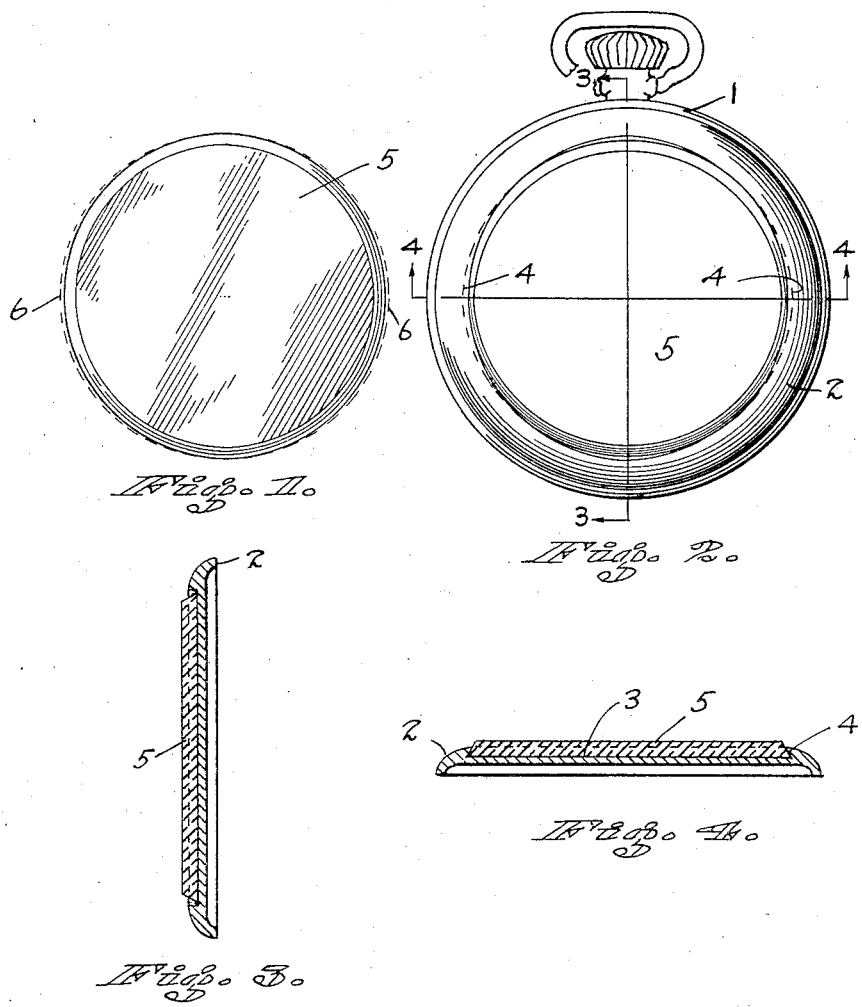
INVENTOR.
ALFRED L. PETERSON
BY
ATTORNEYS.

Patented Sept. 16, 1930

1,775,915

UNITED STATES PATENT OFFICE

ALFRED L. PETERSON, OF OROVILLE, CALIFORNIA, ASSIGNOR OF ONE-HALF TO ADOLF R. KOEHLER, OF LA PORTE, CALIFORNIA

MIRROR FOR WATCHES

Application filed January 8, 1929. Serial No. 331,019.

My invention relates to improvements in mirrors for watches, and it consists in the combinations, constructions and arrangements hereinafter described and claimed.

An object of my invention is to provide a mirror for the back of a watch which will permit the watch to be used as a mirror or to be used as a standard time piece.

The mirror is secured in place by a mere twisting motion, and is rigidly held against accidental removal when once in place.

Other objects and advantages will appear as the specification proceeds, and the novel features will be particularly pointed out in the appended claim.

My invention is illustrated in the accompanying drawing forming a part of this application, in which Figure 1 is a plan view of the mirror;

Figure 2 is a rear elevation of a watch showing the mirror in place; and

Figures 3 and 4 are sections along the lines 3—3 and 4—4 of Figure 2.

In carrying out my invention, I make use of a watch 1 which has a rear cover 2. The rear cover has a substantially circular recess 3 therein. The longer axis of the recess extends along the line 3—3 of Figure 2, while the shorter axis extends along the line 4—4 of Figure 2. It will be noted that the side wall of the recess is undercut at 4.

The mirror 5 has a long and a short axis corresponding with the axes of the recess 3. The dotted lines 6 in Figure 1 illustrate the true circle and show how the mirror is shortened.

From the foregoing description of the various parts of the device, the operation thereof may be readily understood.

The mirror is placed in the recess so that the long axis of the mirror corresponds with the long axis of the recess. The mirror is now turned through an angle of ninety degrees, which will cause the longer portions of the mirror to ride beneath the undercut portions 4. Figure 4 shows a section through the mirror when disposed in this position. The undercut portions 4 securely hold the mirror in place.

Although I have shown and described one embodiment of my invention, it is to be understood that the same is susceptible of various changes, and I reserve the right to employ such changes as may come within the scope of the invention as claimed.

I claim:

A mirror support having a recess with long and short axes, the portions of the wall lying adjacent the ends of the short axis being undercut, the portions lying adjacent the ends of the long axis having edges lying at right angles to the plane of the bottom of the recess, and a mirror having long and short axes corresponding to those of the recess, the edge of said mirror being bevelled, said mirror being held in said support when its longer portions are swung beneath the undercut walls of the recess.

ALFRED L. PETERSON.